UNITED STATES PATENT OFFICE.

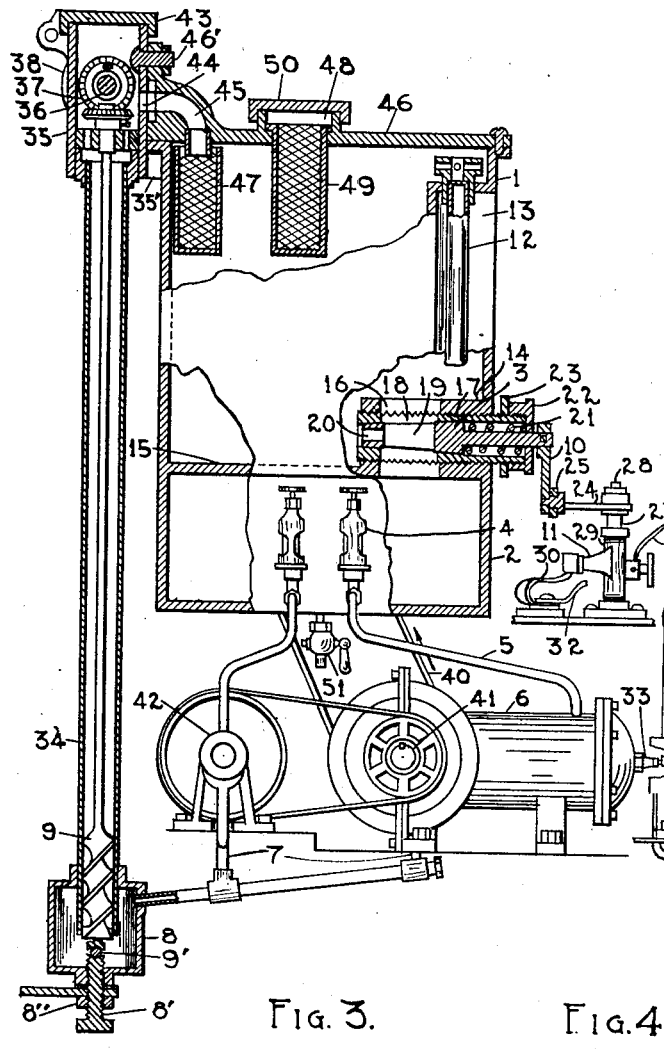

ARTHUR E. MODRELL, OF NEAR SAXTON, MISSOURI.

AUTOMATIC TRACTOR-OILER.

1,350,559.

Specification of Letters Patent.  Patented Aug. 24, 1920.

Application filed March 20, 1920. Serial No. 367,500.

*To all whom it may concern:*

Be it known that I, ARTHUR E. MODRELL, a citizen of the United States, residing at near Saxton, in the county of Buchanan and State of Missouri, have invented certain new and useful Improvements in Automatic Tractor-Oilers, of which the following is a specification, reference being had therein to the accompanying drawing.

My invention relates to improvements in that class of oilers, which are used for lubricating the working parts of tractors, automobiles, and the like, and may be used for lubricating stationary machinery, and the objects of my improvements are, first; to provide an oiler of this class, from which the flow of lubricant will be automatically stopped, when the operator thereof opens the electric circuit, by which the propelling charges of his engine are ignited, second; to provide sight feed lubricant conducting means, whereby the lubricant is conducted from the oil reservoir to the various working parts of the machine where it is used, and to provide draining means and oil elevating means, whereby all of the oil that is in excess of what is actually used shall be returned into said reservoir, for repeated distribution to said working parts, third; to so construct said oil elevating means, that it shall be devoid of valves, be simple, substantial and durable, and not at all liable to get out of order, fourth; to provide a sediment collector of ample proportions, in which sediment, such as pulverized metal, dust and the like will find ample time in which to gravitate to the bottom thereof, thereby insuring thorough separation of sediment from the oil, fifth; to provide emptying means, through which either said sediment or all of the oil in said collector and reservoir can be withdrawn therefrom at any time, sixth; to provide filling means through which the reservoir is filled with oil, and visible indicating means, by the use of which the height of the oil in said reservoir can be seen at any time.

I attain these objects by the mechanism illustrated in the accompanying drawing, in which:

Figure 1 is a side view of the oiler and of mechanisms connected therewith for lubrication thereby, certain parts of the oiler being broken away. Fig. 2 is an end view of the parts seen in Fig. 1, looking toward the left, a small portion of one of the mechanisms being broken away. Fig. 3 is an enlarged section in detail of the oil controlling cock, cut transversely through its ports, looking toward the left. Fig. 4 is a top view in detail, of the electric circuit closer and of the rod and crank connections whereby the same is connected with the cock.

The oiler comprises the oil storage tank 1, the sediment collector 2, connected with said tank by the oil controlling cock 3, a plurality of sight feed oil cups 4, connected with the upper portion of said sediment collector, the plurality of oil conducting pipes 5, one of which leads from one of said cups, into the cylinder of the engine 6, the drain pipes 7, through which all of the excessive amount of oil is drained from the lubricated parts, into the oil well 8, the oil lifter 9, whereby said excessive amount of oil is lifted from said well and is returned therefrom by the gravity of said oil, into said tank, the rod and crank connections, the cock crank 10, and the circuit closer 11, connected with said crank by said connections, all of which are hereinafter more fully described.

The storage tank 1 is provided with the conventional glass tube oil gage 12, the upper and lower ends of which are connected with the upper and lower portions, respectively of said tank, for visibly indicating the height of the oil therein. The central portion of one corner of the tank is of concave form, as shown at 13, for the reception of said gage and for partially shielding it from mechanical injury.

The cock casing 14 is formed integrally with one end and the bottom 15 of said tank and has the port 16 formed therethrough. The cock body 17 is tightly secured in said casing and is provided with the similarly formed port 18. The tapered cock stem 3 is oscillatably mounted in said cock body, through which cock stem the port 19 is formed. All of said ports are formed in register with each other, for permitting free gravitation therethrough, of oil from said tank, into said sediment collector 2. The opening 20 is formed through the smaller end of the cock stem 3, for permitting flow of oil therethrough from tank 1 into said ports, when the oil in said tank is lower than the top of the port 16.

The spring 21 yieldably presses the cock stem 3 inward for insuring close contact of the tapered surface of said cock stem, with the corresponding surface of the cock body 17.

The tension of said spring is adjusted by the nut 22, the position of which is secured by the lock nut 23.

Referring to Fig. 4, the crank 10 is secured on the outer end of the stem of the cock 3 and is rod connected with the L crank 24, by the connecting rod 25. The other end of said L crank is connected with one end of the operating rod 26, the unshown end portion of which is grasped and said rod is thereby manually moved longitudinally for synchronously oscillating said cock stem and the hereinafter described electrode arm of the circuit closer. Since said circuit closer may be any one of the well known kinds, and forms no original element of my invention, the following brief description of the same is deemed sufficient.

Referring to Fig. 1, the L crank 24 is secured on the sleeve 27, which is oscillatably mounted on the rigidly mounted post 28. The circuit closer sleeve 29 is insulated from and rigidly secured on the sleeve 27. The electrode arm 11 is formed with said closer sleeve, the outer end of said arm being shown in contact with the insulated elastic electrode 30, for closing an electric circuit through the electric conductors 31 and 32. Since said electric circuit may be of any well known form, connected with the spark plug 33, for igniting an explosive charge of fuel in the engine 6, said electric circuit is neither shown nor described.

The oil elevator worm 9 is rotatably mounted in the barrel 34, the lower end of which barrel extends into the oil well 8, and is secured in the upper end of the latter.

The lower end of said worm is rotatably mounted on the ball 9', which ball is mounted in the cup seated upper end of the set screw 8', which screw is adjustably screwed through a threaded aperture formed through the bottom of the oil well 8. Said screw is secured in its adjusted positions, by the lock nut 8".

These parts form an adjustable bearing, whereby the worm 9, its stem, and the thereon secured one of the miter gears 37 are raised or lowered, for adjusting the depth of the engagement of the teeth of said miter gears.

The upper end of the barrel 34 is connected with the lower end of the elevator box 35, into which, oil is elevated by said worm, from the oil well 8. The upper end of the stem of said worm is connected with the elevator shaft 36, by the miter gears 37. The grooved pulley 38 is secured on said shaft, and is belt connected with the drive pulley 39, by the belt 40, as seen in Fig. 2. Said drive pulley is secured on the shaft 41, of the engine 6.

One of said plurality of the oil conducting pipes 5 leads from one of the oil cups 4, into the journal box 42, of a mechanism, associated with said engine, for showing that a plurality of the working parts of a number of mechanisms can be lubricated by the use of the described oiler and be drained by use of a plurality of the drain pipes 7.

Referring to Fig. 1, the elevator box lid 43 is hinged on one of the longitudinal upper edges of the elevator box 35, permitting access to its interior. The aperture 44 is formed through the lower portion of one side of said box, and connects with the aperture 45, which is formed through the tank cover 46, which cover is detachably secured on the oil tank 1.

The aperture 45 is provided with the strainer 47, for straining the oil which gravitates from said box through said apertures, and thence through said strainer, into said tank.

The tank cover 46 is provided with the opening 48, which opening in turn is provided with the strainer 49, through which opening and strainer oil is poured, for filling said tank. Said opening is provided with the cap 50.

The elevator box 35 is provided with the two flanges 35' formed therewith, of which but one is shown, as seen in Fig. 1.

Said flanges are secured on one end of the tank 1, by bolts not shown, for securing the lower end of said box on said tank.

The upper end of said box is secured on the upper extremity of the tank cover 46, by the bolt and nut 46'.

In operation, with the parts in the position shown, the operator grasps the unshown end of the pull rod 26, and by longitudinal movement of said rod, in either direction, and by the previously described rods and cranks connected therewith, oscillates the cock stem 3, until the port 19 is thereby oscillated out of register from the port 18, thereby closing the communication between the tank 1 and the sediment collector 2. This movement of the rod 26, by its previously described parts oscillates the arm 11, thereby carrying its end from contact with the elastic electrode 30, thereby opening the electric circuit through the electric conductors 31 and 32, the remainder of said circuit being not shown.

The operator then lifts cap 50 from over the opening 48, and fills the tank 1 with oil, poured through said opening and the strainer 49.

The described parts are thus moved for stopping the ignition of fuel in the engine 6, (thereby stopping said engine,) and for stopping the previously described flow of oil from the tank 1, thereby saving much oil.

The operator opens the cock 3 and closes the described portion of the electric circuit, by moving the pull rod 26 in the opposite direction, until the thereby operated parts are moved from their described positions, to the positions seen in Figs. 1 and 4.

The finer sediment which passes through the strainers 47 and 49, gravitates into the lower part of the sediment collector 2, whence it is drawn, through the cock 51. All of the oil in both said sediment collector and tank 1 can thus be withdrawn by opening the cock 3.

Cock 51 is then closed and the previously described operations are repeated for filling tank 1 with oil.

While the engine is in operation, the excessive amount of oil is drained from the lubricated mechanisms, into the oil well 8, is lifted therefrom into the pump box 35, by rotation of the worm 9, whence said lifted oil gravitates into the tank 1, through the openings 44 and 45 and the strainer 47, for repeated use. It will be understood that when the cock 3 is closed the extremely small amount of oil which thereafter gravitates from the sediment collector 2, through the previously described oil conducting means, produces a partial vacuum in the upper portion of said sediment collector; and that the atmospheric pressure at the lower ends of the pipes 5, prevents further flow of oil therethrough.

While I have shown and described the cock 3, its cock body 17 and the cock casing 14, as being inside of the tank 1, for forming controllable connecting means for connecting the lower portion of said tank with the upper portion of the sediment collector 2, it is evident that any other controllable connection, such as a cock outside of said tank, and provided with pipe connections for performing the same function, could be used without departing from the spirit of my invention, which I reserve the right to do.

Having fully described my invention, what I claim as new and desire to secure by Letters Patent, is:

1. An oil storage tank; a sediment collector formed with and beneath said tank with a floor between them; controllable connecting means whereby said tank and sediment collector are controllably connected; oil conducting means through which oil gravitates from the upper portion of said sediment collector into the working parts of mechanisms for lubricating the same; an oil well; oil draining means through which oil gravitates from said lubricated parts into said oil well; an oil receiving box; oil lifting means whereby oil is lifted from said oil well into said box; and oil directing means through which the lifted oil gravitates from said box into said tank.

2. The combination of an oil storage tank; a sediment collector beneath said tank; oil conducting means whereby said tank and sediment collector are connected; oil controlling means in said oil conducting means whereby flow of oil therethrough is controlled; moving means for oscillating said controlling means; an electric circuit closer; circuit closer moving means whereby the moving parts of said circuit closer are moved for opening and closing an electric circuit and manually moved operating means whereby both of said moving means are moved thereby closing said oil conducting means and opening said circuit closer by movement of said operating means in one direction and vice versa by return movement of said operating means.

3. An oil storage tank; a tank lid detachably secured on said tank said lid having a filling opening and oil conducting means formed therethrough; a sediment collecting chamber formed integrally with the bottom of said tank; a cock casing formed integrally with said tank on the upper side of the bottom thereof; a cock body tightly secured in said cock casing; a cock stem oscillatably mounted in said cock body, said casing, said cock body and said cock stem having ports formed therethrough in register with each other; a crank on the outer end of said cock stem; an oscillatably mounted L crank; a connecting rod whereby one end of said L crank is connected with said cock crank; an electric circuit closer connected with said L crank for oscillation thereby; a manually operated pull rod one end of which is connected with the other end of said L crank; a plurality of sight feed oil conducting means whereby oil is conducted from the upper portion of said sediment chamber into the working parts of mechanisms; an oil well; oil draining means whereby oil is drained from said working parts of said mechanisms into said oil well; an oil box having an opening formed through one side thereof in register with the oil conducting means of said tank lid; and oil elevating means whereby oil is elevated from said oil well into said box.

4. The combination with an oil tank provided with oil conducting means whereby oil is conducted from said tank into the working parts of machines; of an oil well; draining means through which oil is drained from said working parts into said well; a pump barrel the lower end portion of which extends into said well and is secured in the top of the latter; an oil receiving box connected with the upper end of said pump barrel; an oil elevating worm provided with a stem therefor said worm and stem being rotatably mounted in said pump barrel; a miter gear secured on the upper end of said stem; a pump shaft rotatably mounted in said box; a companion miter gear secured on said pump shaft said gear being in engagement with the first mentioned gear; a cup seat screw screwed through the bottom of said oil well; a bearing ball in said cup seat the lower end of said worm being rotatably mounted on said ball; and a lock nut for securing said set screw at variously adjusted heights thereby providing an adjustable bearing whereby the height of said worm and its stem and the thereon secured miter gear is adjusted for adjusting the depth of the engagement of said miter gears.

In testimony whereof I affix my signature.

ARTHUR E. MODRELL.